(12) United States Patent
Wade

(10) Patent No.: US 9,679,234 B2
(45) Date of Patent: Jun. 13, 2017

(54) CHARGING CARD USING POWER HARVESTED FROM READER

(71) Applicant: Square, Inc., San Francisco, CA (US)

(72) Inventor: Jeremy Wade, San Francisco, CA (US)

(73) Assignee: Square, Inc., San Francisco, CA (US)

(*) Notice: Subject to any disclaimer, the term of this patent is extended or adjusted under 35 U.S.C. 154(b) by 218 days.

(21) Appl. No.: 14/321,429

(22) Filed: Jul. 1, 2014

(65) Prior Publication Data

US 2016/0004945 A1 Jan. 7, 2016

(51) Int. Cl.
| | |
|---|---|
| *G06K 19/06* | (2006.01) |
| *G06K 19/07* | (2006.01) |
| *G09C 1/00* | (2006.01) |
| *G06Q 20/00* | (2012.01) |
| *G07F 7/00* | (2006.01) |

(52) U.S. Cl.
CPC ..... *G06K 19/0704* (2013.01); *G06K 19/0709* (2013.01); *G06Q 20/00* (2013.01); *G07F 7/00* (2013.01); *G09C 1/00* (2013.01)

(58) Field of Classification Search
USPC ........................................................ 235/492
See application file for complete search history.

(56) References Cited

U.S. PATENT DOCUMENTS

| | | | | |
|---|---|---|---|---|
| 2003/0019942 | A1* | 1/2003 | Blossom ............ | G06K 19/0701 235/492 |
| 2004/0158728 | A1 | 8/2004 | Kim | |
| 2005/0247785 | A1 | 11/2005 | Bertin | |
| 2010/0218009 | A1 | 8/2010 | Hoeksel et al. | |

FOREIGN PATENT DOCUMENTS

JP H05-333966 A 12/1993

OTHER PUBLICATIONS

International Search Report and Written Opinion mailed Sep. 17, 2015, for PCT Application No. PCT/US2015/038165, filed Jun. 26, 2015.

* cited by examiner

*Primary Examiner* — Rafferty Kelly
(74) *Attorney, Agent, or Firm* — Maynard Cooper & Gale, LLP; Joshua V. Van Hoven, Esq.

(57) ABSTRACT

Disclosed is a rechargeable payment card that can harvest charging energy from card readers. The rechargeable payment card includes a card body and electrical circuitry, a rechargeable energy storage device and a reader interface. The electrical circuitry and the rechargeable energy storage device are attached to the card body. At least a portion of the electrical circuitry needs power to operate when the card is not coupled to an external electrical energy source. The rechargeable energy storage device supplies power to said at least a portion of the electrical circuitry. The reader interface can draw an electrical current from a card reader when the card is coupled to the card reader via the reader interface. At least a portion of the drawn electrical current is used to charge the rechargeable energy storage device.

11 Claims, 6 Drawing Sheets

CHARGING CARD USING POWER HARVESTED FROM READER

BACKGROUND

There are various forms of credit cards and debit cards available to consumers today. These forms include traditional magnetic stripe cards as well as more recently developed "smart cards" (or "chip cards"). A smart card includes an embedded integrated circuit (IC) chip that can provide enhanced security for authenticating credit and debit card transactions. Many smart cards in use today comply with the Europay, MasterCard and Visa (EMV) standards for inter-operations of IC cards, point-of-sale (POS) terminals and automated teller machines (ATMs). The EMV standards specify the interactions between the IC cards and IC card processing devices at the physical, electrical, data and application levels.

Under the EMV standards, an EMV card reader detects an inserted EMV card and supplies electrical power to the EMV card. By using power supplied by the EMV card reader during the transaction, the integrated circuit within the EMV card can perform various functions, such as transaction authentication and/or identity verification. However, a conventional EMV card is a passive device, which cannot operate on its own. Once the EMV card is removed from the EMV card reader, the integrated circuit of the EMV card cannot continue to perform any functionality, since it no longer has access to a power supply.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1:
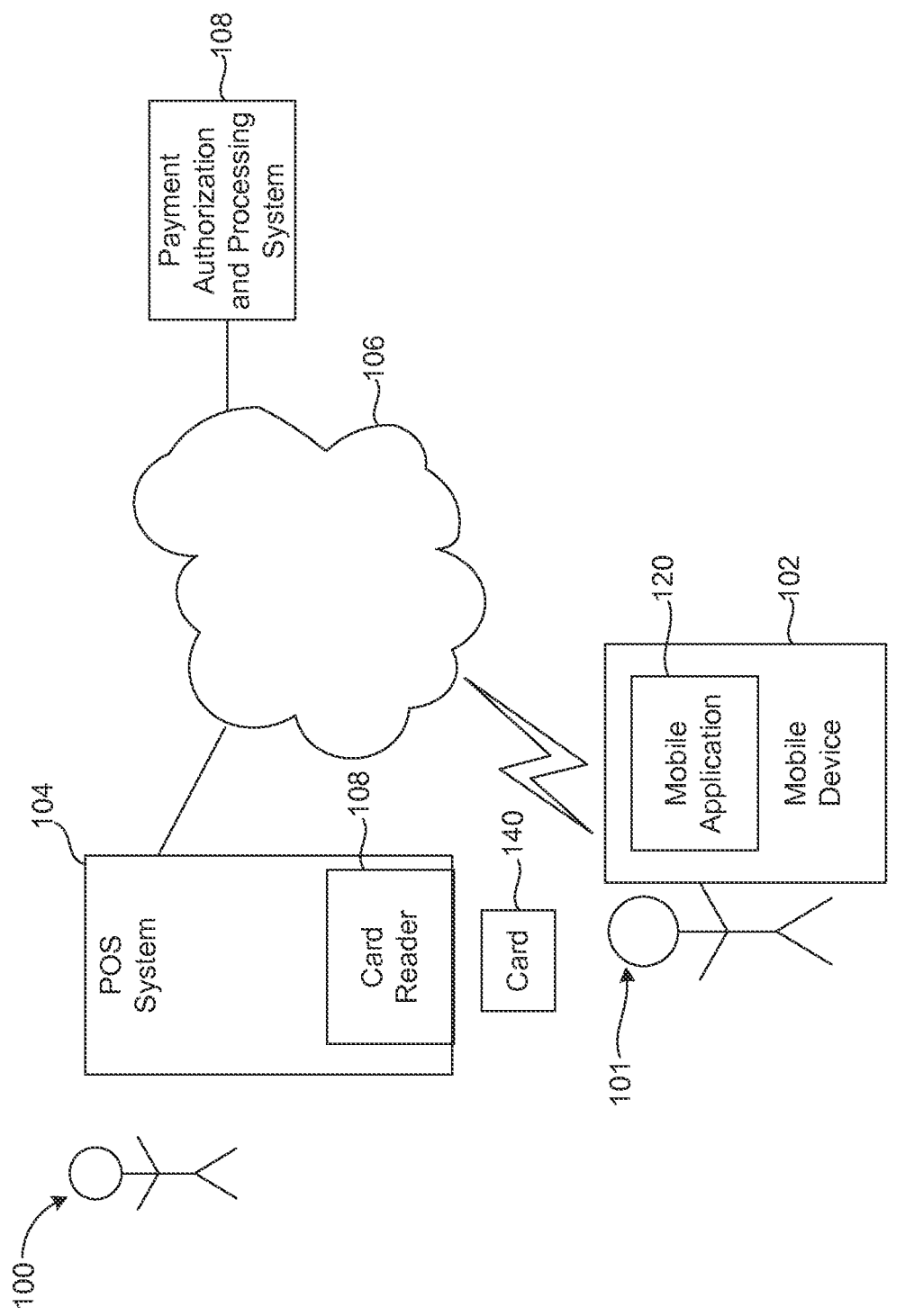
FIG. 1 illustrates an environment in which the rechargeable payment card technology can operate.

References in this description to "an embodiment", "one embodiment", or the like, mean that the particular feature, function, structure or characteristic being described is included in at least one embodiment of the present invention. Occurrences of such phrases in this specification do not necessarily all refer to the same embodiment. On the other hand, the embodiments referred to also are not necessarily mutually exclusive.

Introduced here is a technology that enables a payment card, such as a smart card, to perform functions even when the payment card is not connected to an external power supply (such a card reader). The term "payment card" here can refer to a credit card, debit card, automatic teller machine (ATM) card, stored value card (e.g., gift card), or the like. The technology introduced here provides a payment card that includes a rechargeable energy storage device (e.g., a battery) to power at least a portion of the electrical circuitry of the payment card, when the payment card is not connected with any external power supply. When the payment card is connected with a card reader, the payment card receives electrical power from the card reader, which powers the electrical circuitry of the card and charges the rechargeable energy storage device. Industry standards such as the EMV standards require that the card reader have the capability to supply electrical power that is more than what the electrical circuitry of the card usually needs to operate during a card transaction. Therefore, the card can draw electrical power that is in excess of what is necessary for operation of the electrical circuitry of the card. The card can use the excessive portion of the electrical power to charge the rechargeable energy storage device of the card.

By virtue of the embedded rechargeable energy storage device on the card, the payment card is a standalone electronic device that can operate on its own stored power. Thus, the payment card can perform various functions even when it is not connected with any external power supply. For example, the payment card can include a display component (e.g., liquid crystal display, electrophoretic display or light-emitting diodes (LEDs)) and a keypad, touchpad and/or other form of user input device. Using the keypad or touchpad, a user can select from among multiple payment accounts stored in the payment card and instruct the card to represent the selected payment account. The display component can confirm the selection by, e.g., displaying an account number of the selected payment account. In this way, the payment card can be associated with multiple accounts and can emulate any of multiple cards.

Alternatively or additionally, the payment card can include a wireless communication component such as a Bluetooth Low Energy (BLE) transceiver. A consumer can use a mobile device (e.g., a smart phone) to establish a wireless communication link with the wireless communication component. Through the wireless communication link, the user can instruct the payment card to emulate another card and/or represent a particular payment account selected by the user.

The payment card can include a current limiter circuit to impose an upper limit on the electrical current drawn from the card reader. The upper limit can be adjusted by a processing unit or other component of the payment card. In some embodiments, once the payment card and the card reader are connected, the payment card and the card reader can negotiate various parameters, such as the upper limit on the electrical current to be drawn by the card from the card reader, or the voltage of the electrical power drawn from the card reader.

FIG. 1 illustrates an environment in which the rechargeable payment card technology can operate. The environment includes a merchant POS system 104 of a merchant 100, a mobile device 102 of a user 101 (also referred to as "customer" or "consumer") and a rechargeable payment card 140 of the user 101. The mobile device 102 can be, for example, a smart phone, tablet computer, notebook computer, or any other form of mobile processing device. A mobile application 120 runs on the user's mobile device 102. The environment also includes a payment authorization and processing system 108 for authorizing and processing payment requests. The payment authorization and processing system 108 can include one or more distinct physical computers and/or other processing devices which, in the case of multiple devices, can be connected to each other through one or more wired and/or wireless networks. All of the aforementioned devices can be coupled to each other through an internetwork 106, which can be or include the Internet and one or more wireless networks (e.g., a WiFi network and or a cellular telecommunications network).

Figure 3:
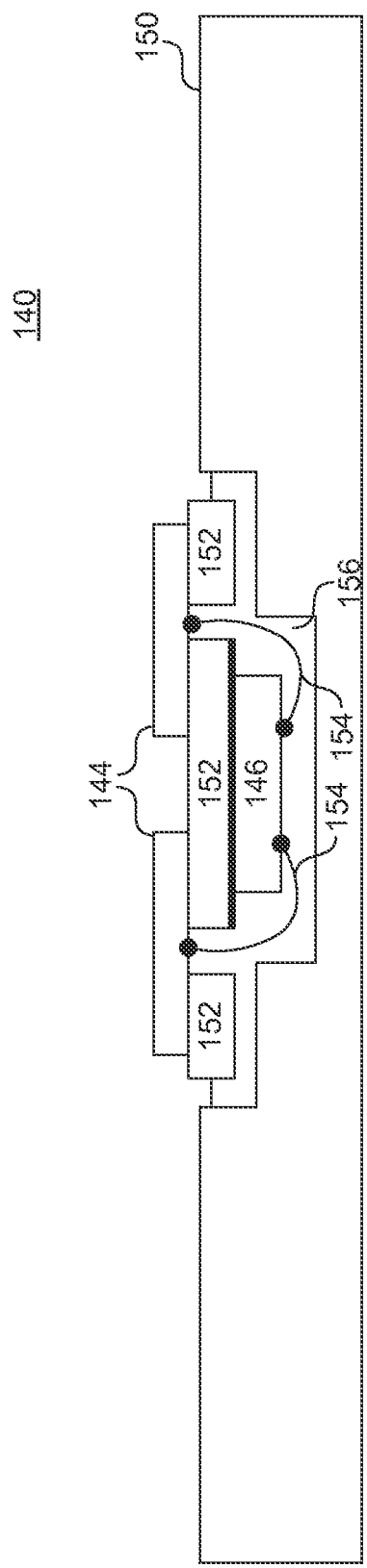
FIG. 3 illustrates a cross-sectional view of an embodiment of the rechargeable payment card.
Figure 4:
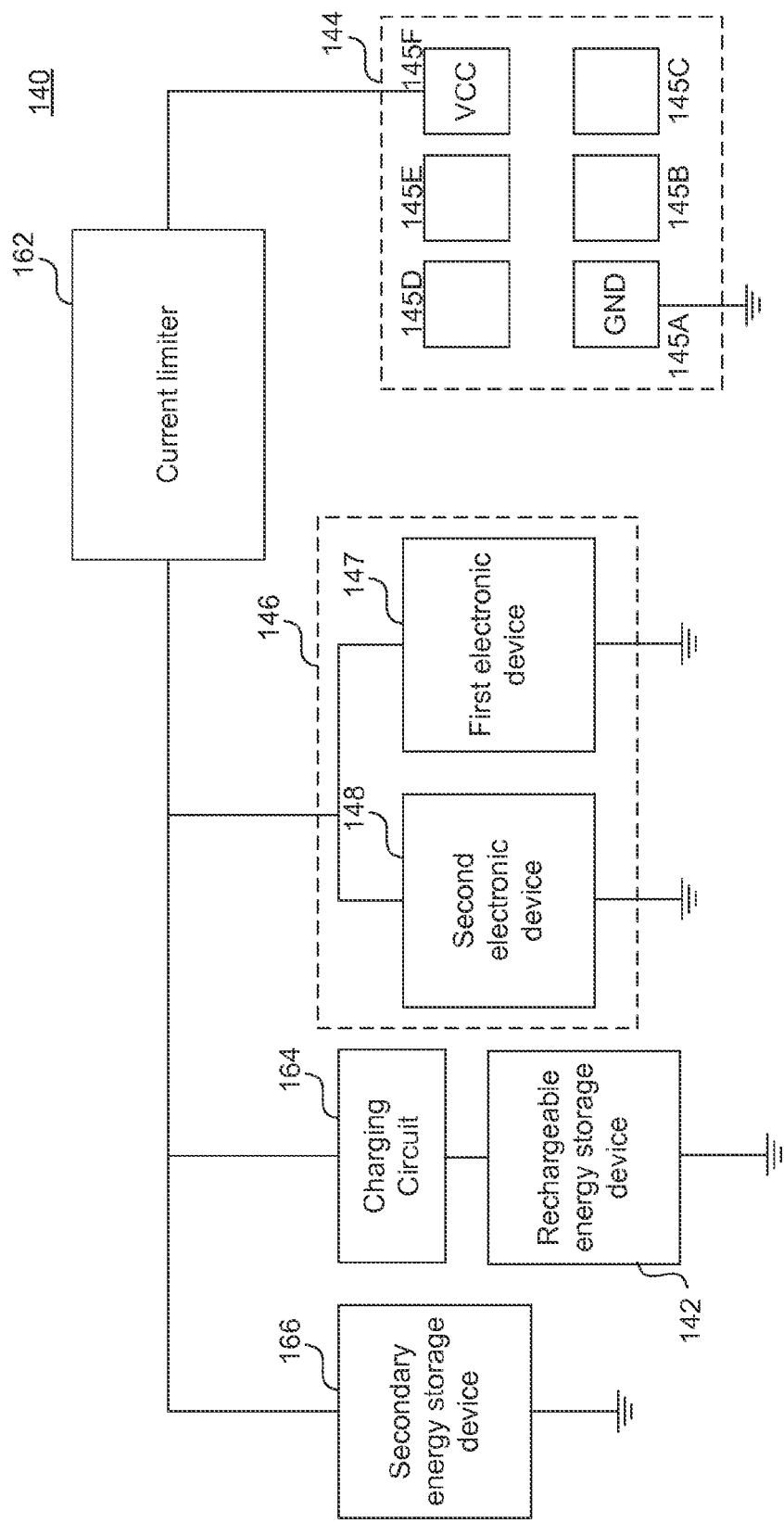
FIG. 4 is block diagram illustrating electrical components of an embodiment of the rechargeable payment card.

The POS system 104 includes a card reader 108 for reading information stored in payment cards. The information can include, e.g., payment account information such as credit card or debit card numbers for conducting financial transactions. As shown in FIGS. 3 and 4, the rechargeable payment card 140 includes a rechargeable energy storage device 142 (e.g., a rechargeable battery), a reader interface 144 (including, e.g., contact pins 145), and an electronic circuitry 146. The electronic circuitry 146 can include, e.g., a Bluetooth low energy (BLE) transceiver for communicating wirelessly with the mobile device 102. The rechargeable energy storage device 142 supplies the electrical power to run the BLE transceiver while the rechargeable payment card 140 is not coupled to any external energy source.

In some embodiments, once the mobile device 102 establishes a BLE connection with the rechargeable payment card 140, the user can configure the rechargeable payment card 140 using the mobile application 120. For example, after the BLE connection has been established, the rechargeable payment card 140 sends information of a digital wallet associated with the rechargeable payment card 140 to the mobile device 102 via the BLE connection. The mobile application 120 lists multiple credit card accounts of the digital wallet and prompts the user 101 to choose one of the accounts. After the user 101 chooses one of the accounts, the mobile payment application 120 notifies the rechargeable payment card 140 of the chosen account via the BLE connection. The rechargeable payment card 140 then configures itself to simulate a payment card associated with the chosen account.

The user 101 or merchant 100 can insert the rechargeable payment card 140 into the card reader 108. The card reader 108 communicates with the rechargeable payment card 140 to conduct a financial transaction (e.g., a purchase of goods or services). Via the reader interface 144, the rechargeable payment card 140 sends data of the selected credit card account to the card reader 108. Meanwhile, the card reader 108 supplies electrical power to the rechargeable payment card 140. The rechargeable payment card 140 uses the received electrical power to operate the electrical circuitry 146 and to recharge the rechargeable energy storage device 142.

The card reader 108 receives the data of the selected credit card account (e.g., the cardholders name, credit card number, expiration date and card verification value (CVV)), and forwards the data to the POS system 104. The POS system 104 sends the data to the payment authorization and processing system 108 for completing the transaction.

Figure 2A:
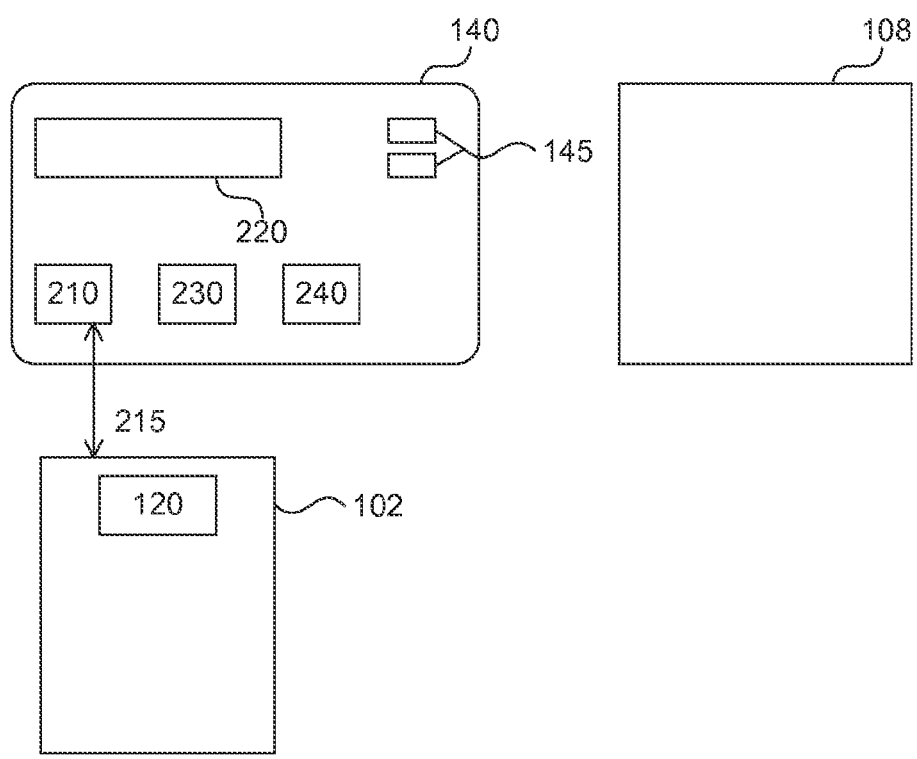
FIGS. 2A and 2B illustrate interactions among a payment card, a mobile device and a card reader.
Figure 2B:
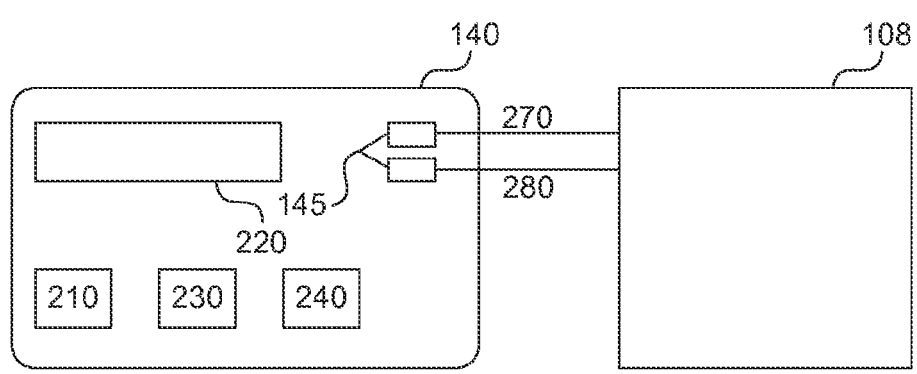

FIGS. 2A and 2B illustrate interactions among a payment card, a mobile device and a card reader, in accordance with an embodiment of the technology introduced here. FIG. 2A shows a payment card 140 which is not connected with any card reader. The payment card 140 can have, e.g., a BLE component (transceiver) 210, a display 220, a battery 230 and a storage 240. The BLE component 210, the display 220 and the storage 240 are able to operate without any power source external to the payment card 140, by drawing electrical power from the battery 230.

Using the BLE component 210, the display 220 and the storage 240, the payment card 140 can dynamically switch between the payment accounts that the payment card 140 represents, by adjusting the payment account information stored in the storage 240.

Using the electrical power from the battery 230, the BLE component 210 can establish a Bluetooth communication channel 215 with the mobile device 102. A mobile application 120 running on the mobile device 102 identifies the payment card 140 through the Bluetooth communication channel 215. The mobile application 120 further identifies multiple payment accounts (e.g., credit card accounts and debit card accounts) associated with the payment card 140. The payment card 140 can send information of these associated payment accounts to the mobile application 120 through the Bluetooth communication channel 215. Alternatively, the mobile application 120 can retrieve the information of these associated payment accounts from a remote server.

The mobile application 120 lists the associated payment accounts and prompts a user to choose one of the payment accounts for the payment card 140 to represent. The mobile application 120 notifies the payment card 140 of the chosen payment account via the Bluetooth communication channel 215. The payment card 140 adjusts the payment account information stored in the storage 240 corresponding to the chosen payment account. The payment card 140 can further display an account number of the chose payment account using the display 220, so that the user can confirm that the payment card 140 has adjusted itself to represent the chosen payment account. The display 220 can be a low power consumption component, such as a liquid crystal display or an electrophoretic display.

Although a user can switch the payment account represented by the payment card using a mobile device having a Bluetooth connection with the payment card 140, there can be other ways for the user to switch the payment account. For example, the payment card may include a user input device such as a keypad, toggle switch or other known or convenient form of input device. Such a keypad, for example, can include one or more keys or buttons. Using the keypad, the user can scroll through available payment accounts and the display 220 can show corresponding payment account number or nickname. The user can press a button of the keypad to confirm a choice of a particular payment account. The display 220 shows a message confirming that the payment account is chosen and currently represented by the payment card 140.

The user or merchant can insert the payment card 140 into a card reader 108 to conduct a financial transaction with the payment account represented by the payment card 140. The card reader 108 can be a standalone device, or a peripheral device attached to another device. The card reader 108 can run on power from a battery or a plug-in power supply. The battery or plug-in power supply of the card reader can be embedded in the card reader 108, or within a device to which the card reader 108 is attached.

FIG. 2B shows the payment card 140 connected with the card reader 108. Through contact pins 145 of the payment card 140, the card reader 108 can establish a data communication channel 270 and an electrical power channel 280 with the payment card 140. Each of these channels can include one or more physical connections. Via the data communication channel 270, the payment card 140 and card reader 108 conduct an initial answer-to-reset (ATR) session to exchange various information. During the ATR session, the payment card 140 can communicate with the card reader 108 about functionalities and capabilities of the payment card 140. For example, the payment card 140 can inform the card reader 108 that the payment card 140 is able to accept electrical power from the card reader 108 at different voltages of 1.8V, 3.3V and 5V. The payment card 140 can also inform the card reader 108, e.g., that the payment card 140 includes a cryptography circuit for enhanced financial transaction security during communication with the card reader 108.

Industry standards such as EMV standards may specify requirements of current or voltage for the electrical power provided by the card reader 108. For example, an industry standard may require the card reader 108 to provide power at different voltages of 1.8V, 3.3V and 5V, or to provide an electrical current of 60 mA. However, the payment card 140 and the card reader 108 can negotiate the voltage or the current limit within the limitation of industry standards.

For example, the payment card 140 can agree to receive power at a voltage of 1.8V when the card reader runs on a battery and the battery level for the card reader is low. The payment card 140 can also agree to draw an electrical current less than 60 mA, depending on the power levels of the battery 230 of the payment card 140 and the battery of the card reader (if the card reader has a battery as well). Alternatively, a user of the mobile device can determine whether the payment card 140 will use electrical power from the card reader 108 to charge the payment card battery 230, and can use the mobile device to instruct the payment card 140 accordingly via the Bluetooth or BLE channel.

In some embodiments, the card reader 108 can determine whether the payment card 140 and the card reader 108 are from the same manufacturer and, if they are, the card reader 108 can then supply power to the card reader 140 at a lower voltage or current, to reduce the burden of power supply from the card reader 108. To enable this determination, the payment card 140 can send a special bit or other type of signal to the card reader, indicating that the payment card 140 belongs to a particular product group (e.g., a group of products from a particular manufacturer). The card reader 108 receives that signal and determines whether the card reader 108 belongs to the same product group.

After the initial ATR session, the card reader 108 supplies the electrical power to the payment card 140 via the electrical power channel 280, at a voltage and a current negotiated during the ATR session. The payment card 140 sends data of the represented payment account to the card reader 108 via the data communication channel 270. Powered by the electrical current from the card reader via the electrical power channel 280, the cryptography circuit of the payment card 140 generates a cryptographic signature and sends the cryptographic signature to the card reader 108. The card reader 108 determines whether the cryptographic signature matches a public key of the payment account, and continues to complete the requested financial transaction.

A processing unit of the payment card 140 controls a current limiter based on the negotiated result during the ATR session. For example, if the payment card 140 and the card reader 108 agreed that electrical current supplied by the card reader 108 will be limited to 55 mA, the processing unit instructs the current limiter to set the upper limit on the incoming current as 55 mA. A portion (typically a small portion) of the incoming current is supplied to run components of the payment card 140, such as the cryptographic circuit and the processing unit of the payment card 140. The rest of the incoming current is supplied to charge the battery 230. The payment card 140 can include a battery charging circuit to impose a charging current upper limit so that the current charging the battery 230 does not exceed a level that can potentially damage the battery 230.

In some situations, the payment card 140 performs a power-intensive functionality and needs more electrical power than what the card reader 108 can supply. In these cases, the payment card 140 can stop charging the battery 230. In turn, the battery 230 starts to supply electrical power to the components of the payment for the power-intensive functionality. For example, a payment card 140 can temporarily overclock the processing unit of the payment card 140 for a power-intensive cryptographic calculation. The overclocked processing unit draws all electrical current supplied by the card reader 108, and simultaneously, draws power from the battery 230.

Once the financial transaction is completed, the user can remove the payment card 140 from the card reader 108, so that the payment card 140 is again disconnected from any external power supply, as illustrated in FIG. 2A. The battery 230 has been charged during the time period when the payment card 140 is connected with the card reader 108. The battery 230 now supplies power to the components of the payment card 140, so that components such as the BLE component 210 can function without the need of an external power supply.

FIG. 3 illustrates a cross-sectional view of an embodiment of the rechargeable payment card 140. The rechargeable payment card 140 includes a card body 150 (also referred to as substrate). The card body 150 can, e.g., have a size of 85.60×53.98 mm$^2$ and a thickness of less than 0.8 mm, conforming to the ISO/IEC 7810 standard. Optionally, the card body 150 can have embossed on its surface card information such card number, expiration date, and name of the card holder. The card body 150 can be formed from any of various materials, such as metal, paper, fiber, celluloid plastic, or polyvinyl chloride (PVC) plastic.

The rechargeable payment card 140 includes a substrate 152 (also referred to as card body). The substrate 152 either can be bound to the card body using adhesive, or can be part of the card body 150. In situation where the substrate 152 is part of the card body 150, the card body 150 can also be referred to as substrate. The electronic circuitry 146 (also referred to as chip 146) is attached to the substrate 152.

The reader interface 144 includes multiple electrical contacts 145 which are attached to the substrate 152. The electrical contacts 145 can include metal or other electrical conductor materials. The electrical contacts 145 can be in the form of pins, or alternatively be balls of a ball grid array, or any other known or convenient form of electrical contacts. The electrical contacts 145 can include a $V_{cc}$ contact for power supply, a GND contact for ground reference voltage, and one or more data contacts for data communications. The electrical contacts 145 are electrically coupled to the chip 146 using multiple bond wires 154. The substrate 152 can have one or more holes so that the bond wires 154 can be passed through the substrate 152. An encapsulation layer 156 is filled in to fix the bond wires 154 in place.

FIG. 4 is block diagram illustrating electrical components of an embodiment of the rechargeable payment card. The rechargeable payment card 140 includes a reader interface 144, which includes multiple metal contact pins 145A-145F. Among these pins 145A-145F, the metal contact pin 145A is a ground (GND) pin for ground reference voltage. The metal contact pins 145B-145E are data pins having various purposes. The metal contact pin 145F is a power supply pin, which draws an electrical current from a card reader (e.g., card reader 108) when the rechargeable payment card 140 is connected with the card reader. The positions and shapes of the metal contact pins 145A-145F are designed to make good electrical contacts with corresponding contact pins of a card reader.

The rechargeable payment card 140 further includes electronic circuitry 146 and rechargeable energy storage device 142. The electronic circuitry 146 includes a first electronic device 147 and a second electronic device 148. The first electronic device 147 is designed to operate while the rechargeable payment card 140 is connected to a card reader by using electrical power provided by the card reader via the power supply pin 145F. The first electronic device 147 can include a processing circuit to authenticate (using e.g. a cryptographic signature), via the reader interface 144, a financial transaction associated with an account represented by the rechargeable payment card 140, when the rechargeable payment card 140 is connected with a card reader.

The electronic circuitry 146, as illustrated in FIG. 4, includes two separate electronic devices 147 and 148. The first electronic device 147 is powered by a card reader when the card 140 is connected with the card reader. The first electronic device 147 can include, e.g., a microprocessor or other types of controlling circuits for controlling one or more components of payment card 140. The second electronic device 148 is powered by the rechargeable energy storage device 142 when the card 140 is not connected with any card reader. However, in some alternative embodiments, all components of the electronic circuitry 146 can be implemented within a single integrated circuit (i.e., a single chip). The chip can be powered by a card reader when the card is connected with the card reader and by the rechargeable energy storage device when the card is not connected with any card reader.

The second electronic device 148 is designed to operate while the payment card is not connected with any card reader. For example, the second electronic device can be a display device that operates while the payment card is not connected with any card reader. Alternatively, the second electronic device can be a BLE transceiver that establishes a wireless connection with another device when the payment card is not connected with any card reader. The rechargeable energy storage device 142 supplies electrical current to power the second electronic device 148 when the rechargeable payment card 140 is not coupled to any card reader. The rechargeable energy storage device 142 can include rechargeable batteries such as thin film lithium batteries.

The power supply pin 145F is electrically coupled to a current limiter 162. The current limiter 162 imposes an upper limit on the electrical current drawn from the card reader via power supply pin 145F. The first electronic device 147 can include a control circuit (not shown) to adjust the upper limit of the electrical current drawn from the card reader imposed by the current limiter 162. The control circuit can be, e.g., a microprocessor or a special-purpose controller circuit. The upper limit can be specified in, e.g., industry standards such as the EMV standards. The upper limit of the current can be greater than an amount of current required to power the first electronic device. Thus, a first portion of the electrical current drawn from the card reader is used to power the first electronic device 147 when the rechargeable payment card 140 is connected with the card reader.

The amount of current allowed by the current limiter 162 can be greater than the amount of current required to power the first electronic device. In that case, a second portion of the electrical current drawn from the card reader, which is not used to power the electronic circuitry 146, can be used to charge the rechargeable energy storage device 142. A charging circuit 164 controls the electrical current (i.e., charging current) flowing through the rechargeable energy storage device 142. The charging circuit 164 can control the charging current based on the status of the rechargeable energy storage device 142. The charging circuit 164 can monitor the status of the rechargeable energy storage device 142 by, e.g., monitoring the voltage of the rechargeable energy storage device 142.

For example, when the rechargeable energy storage device 142 is fully charged, the charging circuit 164 can either stop the charging current, or limit the charging current to a very low current (i.e., trickle charging). When the rechargeable energy storage device 142 is not fully charged, the charging circuit imposes a charging current limitation to ensure that the rechargeable energy storage device 142 is not damaged by a charging current that is too high.

The amount of current allowed by the current limiter 162 can be greater than a summation of the amount of current required to power the first electronic device and the current used to charge the rechargeable energy storage device 142. In that case, the rest of the current can be used to charge a second energy storage device 166. The secondary energy storage device 166 can include, e.g., one or more capacitors. The capacitors can include supercapacitors (also referred to as electric double-layer capacitors, pseudocapacitors or ultracapacitors). The supercapacitors do not have a conventional solid dielectric and have high energy densities that are close to energy densities of batteries. A supercapacitor usually can be charged at a rate that is higher than the charging rate of a battery.

Once the rechargeable payment card 140 is disconnected from the card reader, the secondary energy storage device 166 can continue to charge the rechargeable energy storage device 142 using the energy stored in the secondary energy storage device 166. The charging circuit 164 continues to control the charging current flowing through the rechargeable energy storage device 142, by imposing current limitation based on the status of the rechargeable energy storage device 142

When the rechargeable payment card 140 is not coupled to any card reader, the rechargeable energy storage device 142 uses its stored energy to power the second electronic device 148. The second electronic device 148 can include components to realize various functionalities. For example, the second electronic device 148 can include a wireless communication component (not shown), such as a BLE component. The wireless communication component, which is powered by the rechargeable energy storage device 142, can establish a wireless communication with a mobile device. A user can send instructions from the mobile device to configure the rechargeable payment card 140. For example, the user can change the credit card number represented by the rechargeable payment card 140.

The second electronic device 148 can also include a user interface (not shown), such as a keypad or touchpad. Using the user interface which is powered by the rechargeable energy storage device 142, a user of the rechargeable payment card 140 can select a financial account from multiple financial accounts that the card 140 is capable of representing and instruct the card 140 to present the selected financial account when the card 140 is connected with a card reader. The second electronic device 148 can further include a display component (not shown) powered by the rechargeable energy storage device 142. The display component can display various information, such as the account number of the selected financial account. The display component can include liquid crystal cells or electrophoretic capsules for low power consumption.

Figure 5:
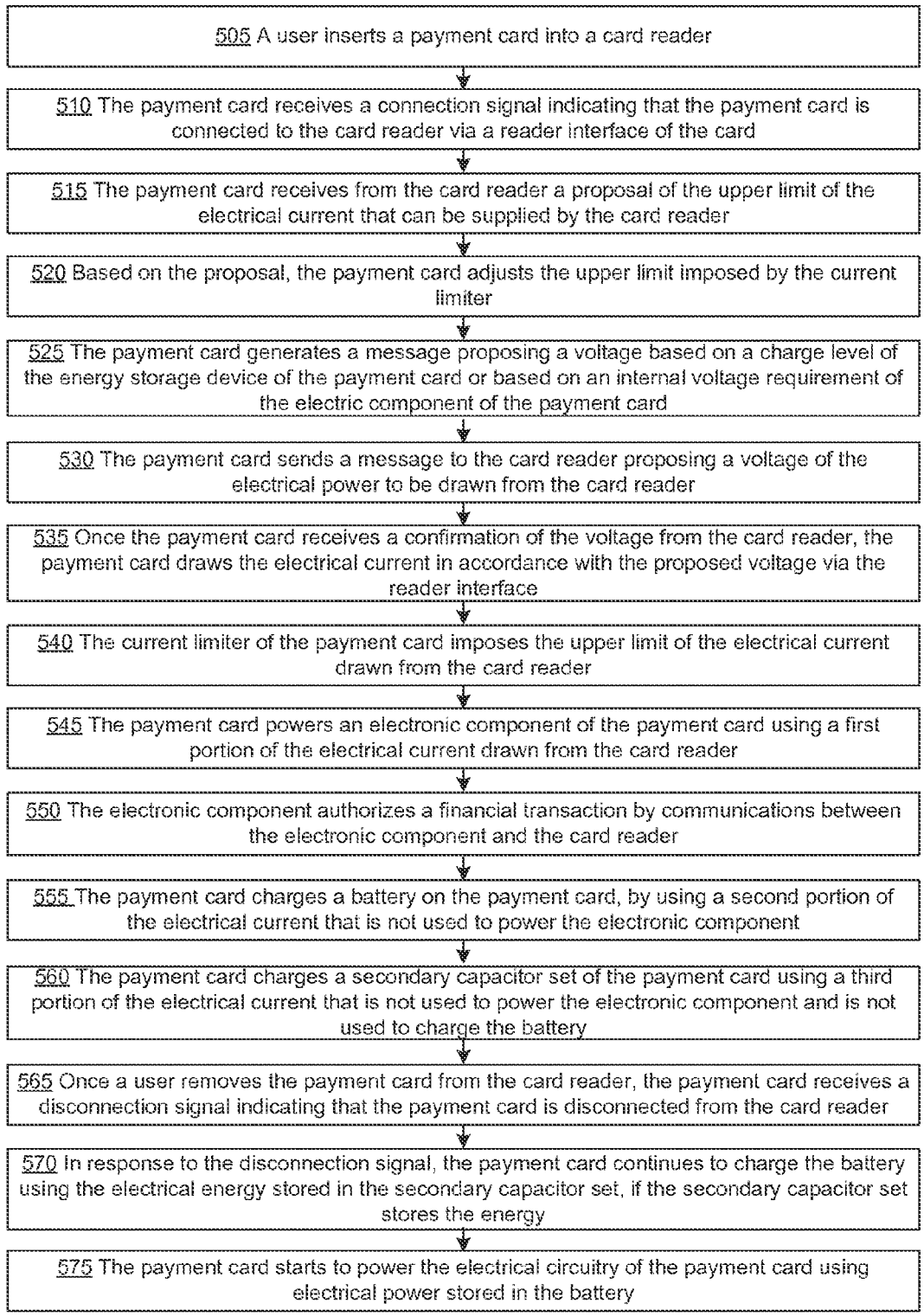
FIG. 5 illustrates an example of a process of charging a payment card by harvesting power supplied by a card reader.

FIG. 5 illustrates an example of a process of charging a payment card by harvesting power supplied by a card reader. The process 500 begins when a user inserts a payment card into a card reader (step 505). The payment card receives a connection signal indicating that the payment card is connected to the card reader via a reader interface of the payment card (step 510).

Then the payment card receives from the card reader a proposal of the upper limit of the electrical current that can be supplied by the card reader (step 515). Based on the proposal, the payment card adjusts the upper limit imposed by the current limiter (step 520). The proposal of the upper limit may be generated based on industry standards such as the EMV standards.

Alternatively, the proposal of the upper limit of the electrical current may be generated based on a power supply condition of the card reader or based on a power supply condition of an electronic device to which the card reader is attached. For example, if the card reader is powered by a battery and the battery level is low, the card reader may propose a low upper limit of the electrical current. If the card reader draws power from another mobile device and the battery level of the mobile device is low, the card reader may propose a low upper limit.

The payment card and the card reader can also negotiate other electrical parameter values (e.g., voltage) of the electrical power to be drawn from the card reader. For example, the payment card can generate a message proposing a voltage based on a charge level of the energy storage device of the payment card or based on an internal voltage requirement of the electric component of the payment card (step 525). Then the payment card sends the message to the card reader proposing a voltage of the electrical power to be drawn from the card reader (step 530). The message may include multiple options of different voltages, such as 1.8V, 3.3V, or 5V.

Alternatively, during the communications between the payment card and card reader, the card reader can also propose voltage or other parameter value of the electrical power to be drawn from the card reader. For example, the card reader may determine that its own power source has limited electrical power and proposes a lower voltage to the payment card. A lower voltage usually leads to a lower power to be drawn from the card reader. Therefore, the payment card and card reader negotiates a reasonable voltage to avoid a low power situation of the card reader or the device to which the card reader attaches.

Once the payment card receives a confirmation of the voltage from the card reader, the payment card draws the electrical current in accordance with the proposed voltage via the reader interface (step 535). The current limiter of the payment card imposes the upper limit of the electrical current drawn from the card reader (step 540). Different portions of the electrical current travel to different components of the payment card.

The payment card powers an electronic component of the payment card using a first portion of the electrical current drawn from the card reader (step 545). The electronic component can, e.g., authorize a financial transaction by communications between the electronic component and the card reader (step 550).

The payment card can further charge a battery on the payment card, by using a second portion of the electrical current that is not used to power the electronic component (step 555). In some cases, the electrical current drawn from the card reader is more than enough to power the electronic component and to charge the battery. The these cases, the payment card further charges a secondary capacitor set of the payment card using a third portion of the electrical current that is not used to power the electronic component and is not used to charge the battery (step 560). The secondary capacitor set can include one or more capacitors to store the remaining electrical power supplied by the card reader.

Once a user removes the payment card from the card reader, the payment card receives a disconnection signal indicating that the payment card is disconnected from the card reader (step 565). In response to the disconnection signal, the payment card can continue to charge the battery using the electrical energy stored in the secondary capacitor set, if the secondary capacitor set stores the energy (step 570).

Further in response to the disconnection signal, the payment card starts to power the electrical circuitry of the payment card using electrical power stored in the battery (step 575). The payment card can power only a portion of electrical circuitry of the payment card when the payment card is not coupled to any external power source. For example, the payment card can choose to power the BLE communication component of the payment card, but not to power the circuit for conducting financial transactions. Alternatively, the payment card can power the entire electrical circuitry of the payment card.

When the payment card is powered by its own battery, the payment card can continue performing various functionalities. For example, the battery can power a wireless communication component of the payment card so that the payment card can receive via an established wireless communication link (e.g., BLE link) an instruction to configure the payment card. The battery can power an input interface (e.g., keypad or touchpad) of the payment card, so that a user can manually configure the payment card by providing inputs via the input interface.

Those skilled in the art will appreciate that the logic illustrated in FIG. 5 and described above, may be altered in a variety of ways. For example, the order of the logic may be rearranged, substeps may be performed in parallel, illustrated logic may be omitted, other logic may be included, etc. For instance, the step for powering electrical circuitry and the step for charging the battery can be performed simultaneously.

Figure 6:
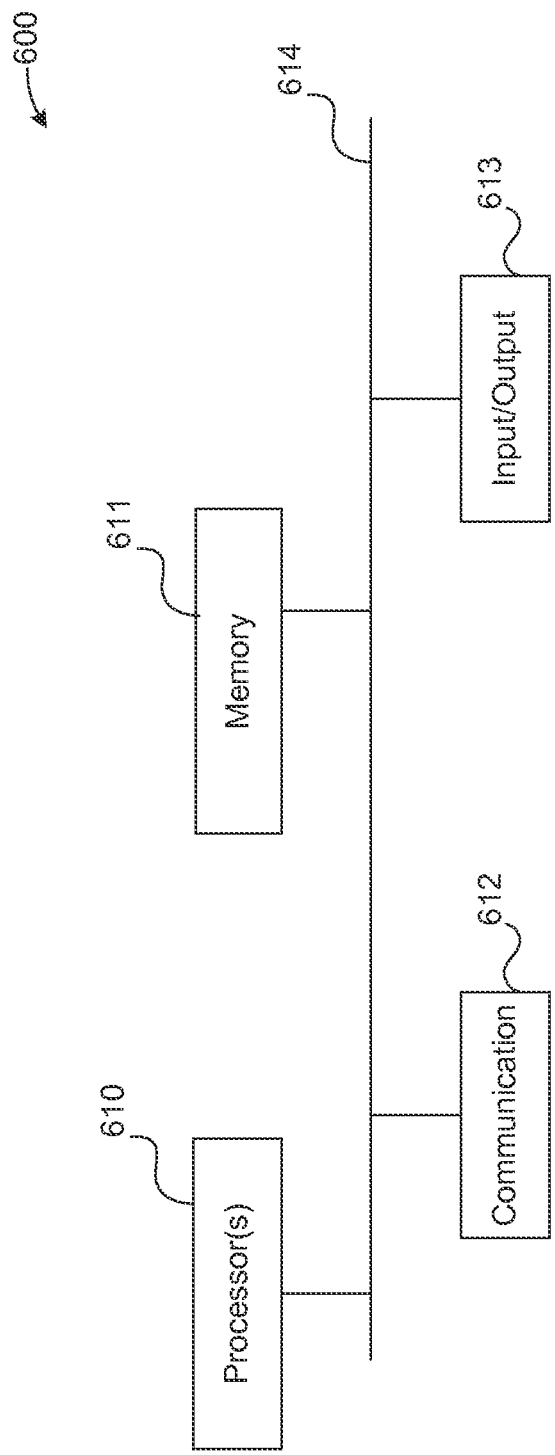
FIG. 6 is a high-level block diagram showing an example of processing system in which at least some operations related to a rechargeable payment card can be implemented.

FIG. 6 is a high-level block diagram showing an example of a processing device 600 that can represent the electrical/electronic elements of any of the devices described above, such as the mobile device 102, POS system 104, card reader 108, and rechargeable payment card 140.

In the illustrated embodiment, the processing system 600 includes one or more processors 610, memory 611, a communication device 612, and one or more input/output (I/O) devices 613, all coupled to each other through an interconnect 614. The interconnect 614 may be or include one or more conductive traces, buses, point-to-point connections, controllers, adapters and/or other conventional connection devices. The processor(s) 610 may be or include, for example, one or more general-purpose programmable microprocessors, microcontrollers, application specific integrated circuits (ASICs), programmable gate arrays, or the like, or a combination of such devices. The processor(s) 610 control the overall operation of the processing device 600. Memory 611 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 611 may store data and instructions that configure the processor(s) 610 to execute operations in accordance with the techniques described above. The communication device 612 may be or include, for example, an Ethernet adapter, cable modem, Wi-Fi adapter, cellular transceiver, Bluetooth transceiver, or the like, or a combination thereof. Depending on the specific nature and purpose of the processing device 600, the I/O devices 613 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A payment card to facilitate a financial transaction between a customer and a merchant and to perform a functionality without external power source, comprising:
   a card body;
   electronic circuitry attached to the card body, the electronic circuitry including a first electronic device configured to operate while the payment card is connected to a card reader of a merchant terminal of the merchant by using power provided by the card reader during a period of time when the customer inserts the payment card into the card reader, the electronic circuitry further including a second electronic device configured to perform the functionality of the payment card without external power source while the payment card is not connected with any card reader after the customer removes the payment card from the card reader, the electronic circuitry being configured to draw an amount of current from the card reader that is greater than an amount of current required to power the first electronic device;
   a rechargeable energy storage device attached to the card body and configured to supply electrical current to power the second electronic device when the payment card is not coupled to any card reader, wherein the rechargeable energy storage device is charged by at least a portion of the current drawn from the card reader;
   a reader interface attached to the card body and configured to connect with the card reader, through which to draw an electrical current from the card reader when the payment card is connected with the card reader so that the first electronic device operates and the rechargeable energy storage device is charged using the electrical current;
   a current limiter configured to impose an upper limit on the electrical current drawn from the card reader, the upper limit being greater than the amount of current required to power the first electronic device, such that a first portion of the electrical current drawn from the card reader is used to power the first electronic device when the payment card is connected with the card reader; and
   a charging circuit configured to charge the rechargeable energy storage device, when the payment card is connected with the card reader, from a second portion of the electrical current that is not used to power the electronic circuitry when the payment card is connected with the card reader.

2. The payment card of claim 1, further comprising:
   a secondary energy storage device attached to the card body, the secondary energy storage device configured to store electrical energy from at least a portion of the electrical current, when the payment card is connected with the card reader and the second portion of the electrical current exceeds a charging current limitation imposed by the charging circuit for charging the rechargeable energy storage device.

3. The payment card of claim 2, wherein the secondary energy storage device comprises a capacitor.

4. The payment card of claim 1, wherein the electronic device comprises:
   a wireless communication component configured to communicate with a mobile device to configure the payment card, the wireless communication component being powered by the rechargeable energy storage device when the payment card is disconnected form the card reader.

5. The payment card of claim 1, wherein the electronic circuitry comprises:
   a control circuit configured to adjust the upper limit of the electrical current drawn from the card reader imposed by the current limiter.

6. The payment card of claim 1, wherein the rechargeable energy storage device comprises a rechargeable battery or a capacitor.

7. A card comprising:
   a card body;
   electrical circuitry attached to the card body;
   a rechargeable energy storage device attached the card body and configured to supply power to said at least a portion of the electrical circuitry;
   a reader interface configured to draw an electrical current from a card reader when the card is coupled to the card reader, at least a portion of the electrical current being used to charge the rechargeable energy storage device when the card is coupled to the card reader; and a current limiter configured to impose an upper limit on the electrical current drawn from the card reader, the upper limit being greater than or equal to an amount of current required to power the electrical circuitry, such that a portion of the electrical current drawn from the card reader is used to power the electrical circuitry when the card is coupled to the card reader.

8. The card of claim 7, wherein the electronic circuitry further includes a processing circuit configured to authenticate, via the reader interface, a financial transaction associated with an account represented by the card, when the card is coupled to the card reader.

9. The card of claim 7, further comprising:

a user interface configured to instruct the payment card to represent a financial account selected from a plurality of financial accounts that the card is capable of representing, the user interface being powered by the rechargeable energy storage device when the card is disconnected from the card reader.

10. The card of claim 9, further comprising:

a display component configured to display information of the selected financial account, the display component being powered by the rechargeable energy storage device when the card is disconnected from the card reader.

11. The card of claim 7, wherein the electronic circuitry further includes a wireless communication component configured to communicate with a mobile device to configure the card, the wireless communication component being powered by the rechargeable energy storage device when the card is not coupled to the external electrical energy source.

* * * * *